(12) United States Patent
Niepceron et al.

(10) Patent No.: US 11,448,084 B2
(45) Date of Patent: Sep. 20, 2022

(54) REDUCTION GEAR FOR TURBOMACHINE EQUIPPED WITH AN ELECTRIC GENERATOR

(71) Applicant: SAFRAN TRANSMISSION SYSTEMS, Colombes (FR)

(72) Inventors: Clément Paul René Niepceron, Moissy-Cramayel (FR); Boris Pierre Marcel Morelli, Moissy-Cramayel (FR); Florian Rappaport, Moissy-Cramayel (FR); Bernard Guy Antoine Charpentier, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 17/141,707

(22) Filed: Jan. 5, 2021

(65) Prior Publication Data
US 2021/0215059 A1   Jul. 15, 2021

(30) Foreign Application Priority Data

Jan. 9, 2020 (FR) ...................................... 2000156

(51) Int. Cl.
*F01D 15/12* (2006.01)
*F16H 1/28* (2006.01)
(Continued)

(52) U.S. Cl.
CPC ............. *F01D 15/12* (2013.01); *B64D 27/16* (2013.01); *B64D 41/00* (2013.01); *F01D 15/10* (2013.01);
(Continued)

(58) Field of Classification Search
CPC .......... F01D 15/12; F01D 15/10; F01D 25/24; B64D 41/00; B64D 27/16; F16H 1/25;
(Continued)

(56) References Cited

U.S. PATENT DOCUMENTS

2010/0032961 A1   2/2010  Numajiri
2019/0214884 A1*  7/2019  Palmer ..................... F16H 1/28

FOREIGN PATENT DOCUMENTS

EP    3511557 A1   7/2019
EP    3569845 A1   11/2019

OTHER PUBLICATIONS

Official Communication dated Sep. 7, 2020, in corresponding FR Application No. 2000156 (2 pages).

\* cited by examiner

*Primary Examiner* — Joseph Ortega
(74) *Attorney, Agent, or Firm* — Bookoff McAndrews, PLLC.

(57) ABSTRACT

A mechanical reduction gear for a turbomachine, in particular for an aircraft, including a first sun gear having a central axis forming a main axis of the reduction gear, a ring gear, planet gears, a planet carrier, and at least one electric generator, in which the electric generator has a first set of electromagnetic elements and a second set of electromagnetic elements, wherein one among the first and second set of electromagnetic elements is a first set of coils, each coil of this first set of coils being wound around a direction parallel to the main axis, and in which the other among the first and second set of electromagnetic elements is configured to induce a current in the first set of coils when it is driven with a relative movement with respect to the first set of coils.

13 Claims, 4 Drawing Sheets

(51) Int. Cl.
*F01D 25/24* (2006.01)
*F01D 15/10* (2006.01)
*B64D 41/00* (2006.01)
*B64D 27/16* (2006.01)
*H02K 7/116* (2006.01)
*H02K 7/18* (2006.01)
*H02K 21/24* (2006.01)

(52) U.S. Cl.
CPC ............... *F01D 25/24* (2013.01); *F16H 1/28* (2013.01); *H02K 7/116* (2013.01); *H02K 7/1823* (2013.01); *F05D 2220/76* (2013.01); *F05D 2240/60* (2013.01); *H02K 21/24* (2013.01)

(58) Field of Classification Search
CPC ....... F16H 57/08; F16H 57/082; H02K 7/116; H02K 7/1823; H02K 16/00; H02K 21/24; F05D 2220/60; F05D 2220/76; F05D 2240/60; F05D 2260/40311; F02C 7/36; F02C 6/00; F02C 6/20
See application file for complete search history.

[Fig. 1]
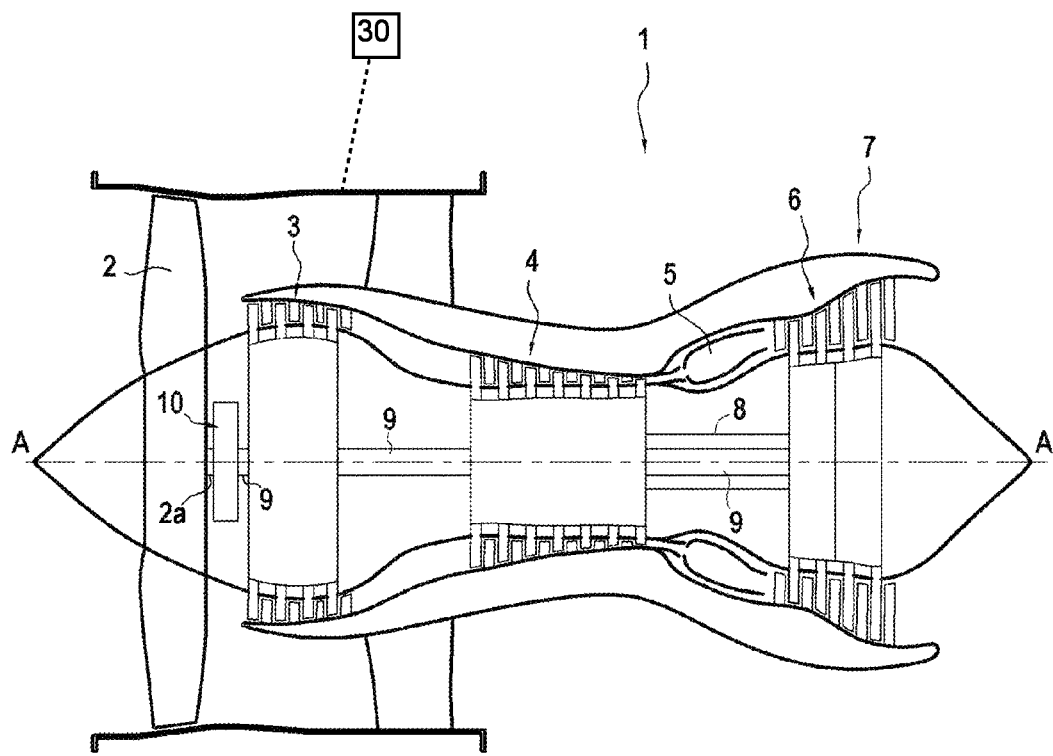
[Fig. 2]
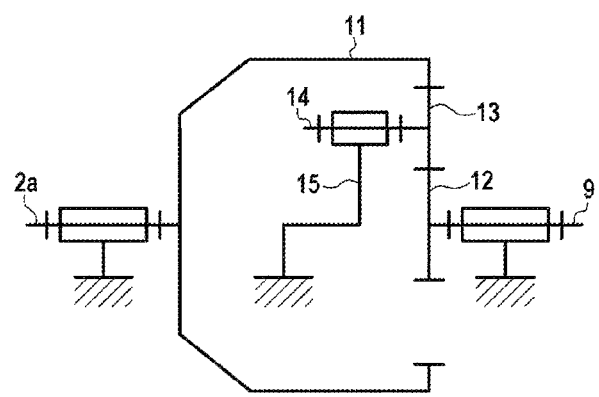

[Fig. 3]
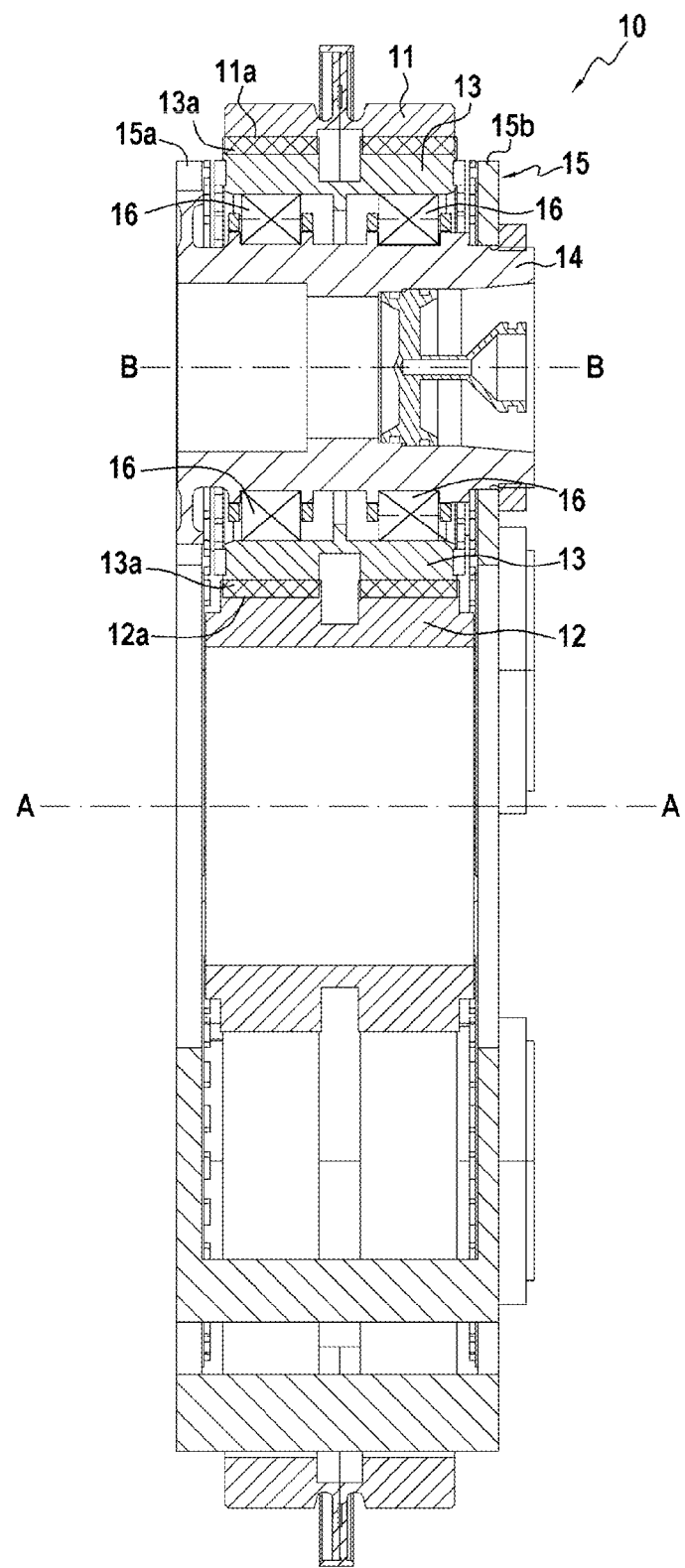

[Fig. 4]
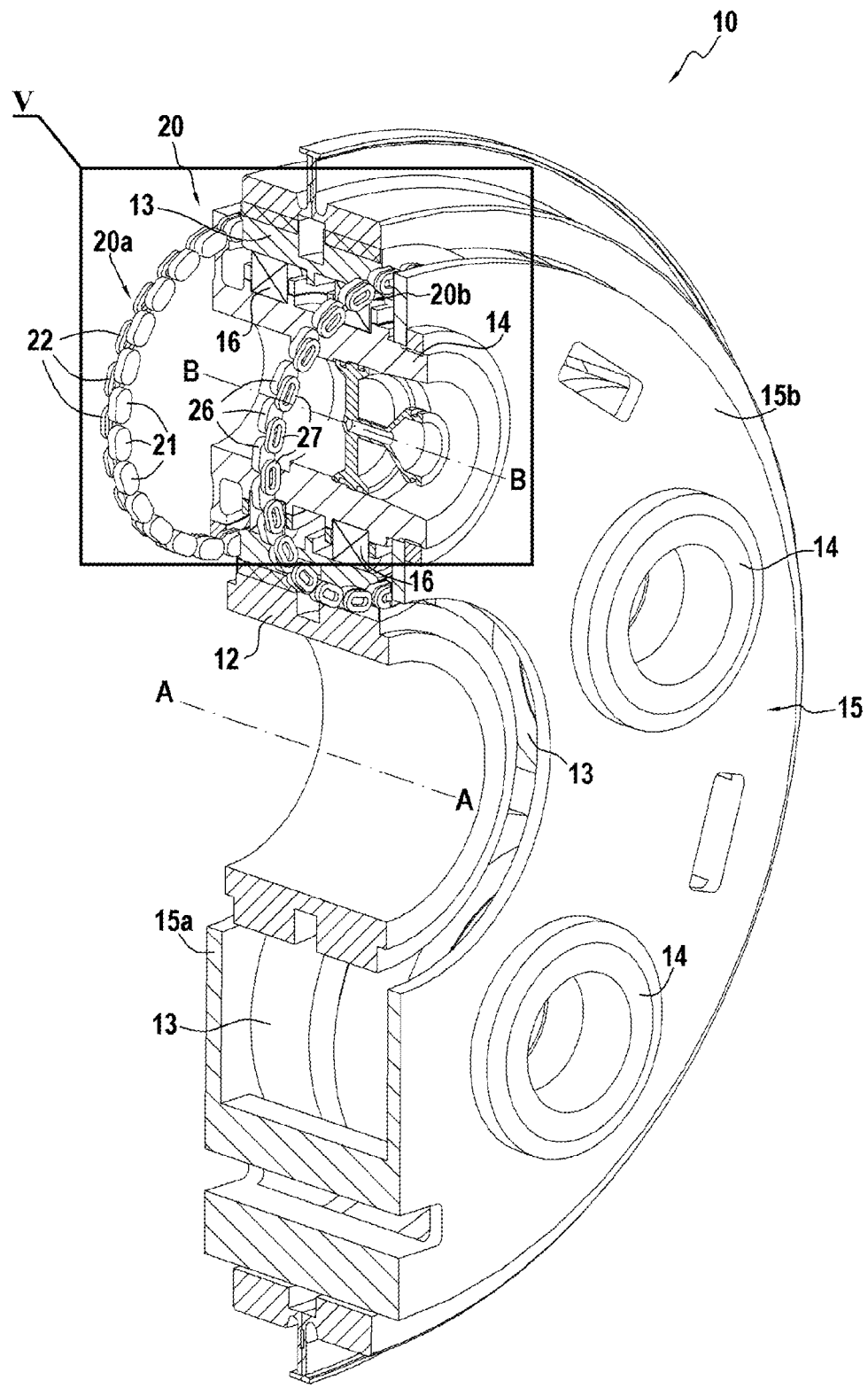

[Fig. 5]
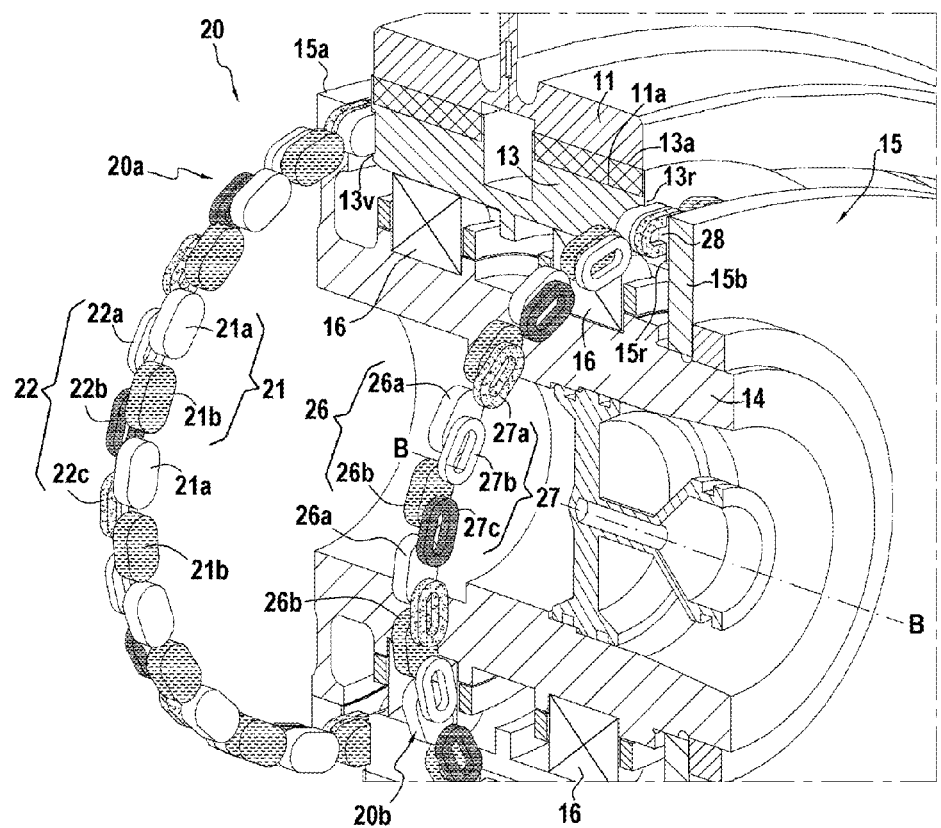
[Fig. 6]
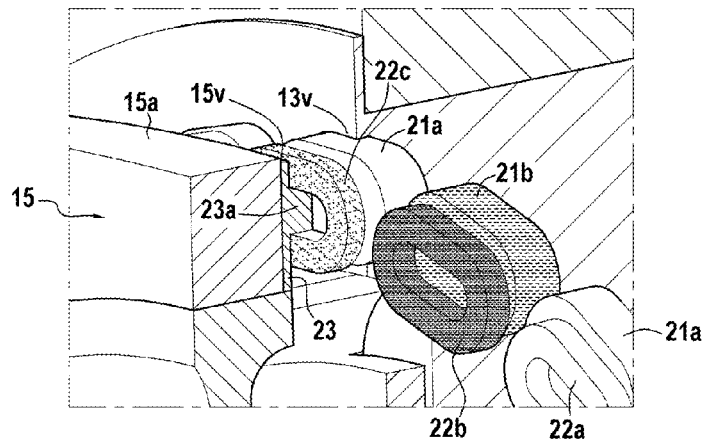

REDUCTION GEAR FOR TURBOMACHINE EQUIPPED WITH AN ELECTRIC GENERATOR

CROSS-REFERENCE TO RELATED APPLICATION(S)

This application claims priority to French Patent Application No. 2000156, filed on Jan. 9, 2020, the disclosure of which is incorporated herein by reference in its entirety.

TECHNICAL FIELD

The present disclosure relates to a mechanical reduction gear for a turbomachine equipped with an electric generator.

A mechanical reduction gear can in particular be used in an aircraft turbojet in order to supply electrical energy to the aircraft. However, it could just as well be used in any other type of turbomachine.

PRIOR ART

New models of aircraft, as well as changes in usage patterns and services offered on board, tend to increase the need of the aircraft for electricity. Consequently, in order to increase the electrical power thus supplied to the aircraft, it is necessary to increase the mechanical power extracted from the turbojets.

Usually, these power extractions are performed on the high-pressure (HP) shaft of the engine, particularly by means of the accessory drive gearbox.

Nevertheless, such extractions generate strong stresses on the operability of the engine, the latter strongly reducing its performance. Moreover, for each engine, there exists a level beyond which it is no longer possible to extract mechanical energy without compromising the proper operation of the engine.

There exists therefore a real need for a device allowing greater electrical power to be supplied which does not have, at least in part, the inherent disadvantages of the aforementioned known configurations.

DISCLOSURE OF THE INVENTION

The present disclosure relates to a mechanical reduction gear for a turbomachine, in particular for an aircraft, comprising a sun gear equipped with external teeth, having a central axis forming a main axis of the reduction gear, a ring gear equipped with internal teeth coaxial with the sun gear, planet gears simultaneously meshed with the sun gear and the ring gear, a planet carrier, carrying spindles around which the planet gears are mounted in rotation, and at least one electric generator, in which the electric generator comprises a first set of electromagnetic elements disposed on a first frontal face of a first planet gear, and a second set of electromagnetic elements disposed on a first frontal surface of the planet carrier, said first frontal surface of the planet carried extending facing the first frontal face of the sun gear so that the first set of electromagnetic elements and the second set of electromagnetic elements are disposed facing each other, in which one among the first and second set of electromagnetic element is a first set of coils, each coil of this first set of coils being wound around a direction parallel to the main axis, and in which the other among the first and the second set of electromagnetic elements is configured to induce a current in the first set of coils when it is driven with a relative movement with respect to the first set of coils.

Thus, thanks to a reduction gear of this type, it is possible to extract mechanical energy and convert it into electrical energy in a simple, effective and compact manner.

In particular, thanks to this axial flux configuration, the electric generator can be easily integrated into the usual members of a mechanical reduction gear, without appending new systems to it. First of all, no intermediate transmission element is necessary because the generator is included in the reduction gear itself. Secondly, the electromagnetic elements can be mounted directly on the planet carrier and the planet gears, which naturally move facing the planet carrier without it being necessary to install coils around the reduction gear, which offers great compactness to the system and therefore leaves unchanged, or practically unchanged, the integration of the reduction gear within the turbomachine. Finally, thanks to this position on the interface between the planet gears and the planet carrier, the electric generator can benefit from the cooling device for the bearings of the planet gears without it being necessary to place a specific additional cooling device.

Moreover, in that this type of reduction gear is most often connected to the low-pressure (LP) shaft of the turbomachine, this configuration allows extracting mechanical energy from the LP shaft and not from the HP shaft, hence relieving the latter, which ensures better operability and better performance for the turbomachine.

In certain embodiments, the other among the first and second set of electromagnetic elements is a first set of magnets, each of the poles of which is oriented in a direction parallel to the main axis. Magnets of this type naturally generate their own magnetic field without it being necessary to activate them from the outside, which is advantageous within the scope of a gear in rotation. However, in other embodiments, electromagnets would also be conceivable.

In certain embodiments, the sun gear, the ring gear and the planet gears are placed in the same plane. This ensures a large capacity for the system.

In certain embodiments, the rotation of the planet carrier is blocked. The reduction therefore occurs between the sun gear and the ring gear. In a configuration of this type, the planet carrier is therefore fixed, which facilitates the cabling of the coils on the planet carrier and the recovery of the current produced by the electric generator. In particular, the planet carrier can be fastened to the casing (stator) of the turbomachine.

In certain embodiments, the first set of electromagnetic elements is said first set of magnets, and the second set of electromagnetic elements is said first set of coils. It is in fact easier to mount and cable coils on the planet carrier.

In certain embodiments, the electric generator comprises a third set of electromagnetic elements, disposed on a second frontal face of the sun gear, and a fourth set of electromagnetic elements, disposed on a second front surface of the planet carrier, said second frontal surface extending facing the second frontal face of the sun gear, in which one among the third and fourth set of electromagnetic elements is a second set of coils, each coil of this second set of coils being wound around a direction parallel to the main axis, and in which the other among the third and fourth set of electromagnetic elements is configured to induce a current in the second set of coils when it is driven with a relative movement with respect to the second set of coils. A configuration of this type allows extracting twice as much energy. Moreover, it ensures symmetry on either side of the planet gear, which allows cancelling the resultant of the so electromagnetic forces sustained by the planet gear: thus movement of the planet gear and/or excessive stresses in its teeth are avoided.

In certain embodiments, the other among the third and fourth set of electromagnetic elements is a second set of magnets, each oriented in a direction parallel to the main axis.

In certain embodiments, the third set of electromagnetic elements is said second set of magnets and the second set of electromagnetic elements is said second set of coils.

In certain embodiments, the configuration of the second set of magnets is symmetrical with the configuration of the first set of magnets with respect to the median plane of the reduction gear.

In certain embodiments, the configuration of the second set of coils is symmetrical with the configuration of the first set of coils with respect to the median plane of the reduction gear. Thus symmetrical and compatible operation of the two electric generating units is ensured. The forces exerted on the planet gear are further balanced.

In certain embodiments, at least one set of magnets, and preferably each set of magnets, comprises a ring of several magnets, regularly spaced along the same circle centered on the axis of rotation of the planet gear, all oriented axially while alternating the direction of their North poles.

In certain embodiments, a space of less than 1 cm separates two consecutive magnets within the ring of magnets.

In certain embodiments, at least one set of magnets, and preferably each set of magnets, comprises between 10 and 60 magnets, preferably between 12 and 48 magnets.

In certain embodiments, the magnets of at least one set of magnets, and preferably each set of magnets, are permanent magnets, preferably of the Samarium-Cobalt type. In particular, magnets of the Samarium-Cobalt type have a high Curie temperature, allowing them not to lose their magnetization at the operating temperature of the reduction gear.

In certain embodiments, the magnets of at least one set of magnets, and preferably each set of magnets, have a Curie temperature greater than 300° C.

In certain embodiments, at least one set of coils, and preferably each set of coils, comprises a ring of several coils, regularly spaced along the same circle centered on the axis of rotation of the planet gear, all wound around an axial direction.

In certain embodiments, a space of less than 1 cm separates two consecutive coils within the ring of coils.

In certain embodiments, at least one set of coils, and preferably each set of coils, comprises three coil assemblies, the coils of one given assembly being connected electrically to one another within the same circuit. This allows the production of three-phase current.

In certain embodiments, the coils of the same coil assembly are assembled in series. This allows obtaining a higher voltage. However, a parallel or hybrid assembly is also conceivable.

In certain embodiments, the first and second set of coils are assembled in series. In other embodiments, they could be assembled in parallel In certain embodiments, said ring of coils comprises a whole number of successive groups of coils, each group consisting, successively, of a batch of coils forming part of the first coil assembly, a batch of coils forming part of the second coil assembly and a batch of coils forming part of the third coil assembly. This allows obtaining, virtually, coils of larger sizes based on smaller unit coils. In particular, each batch can comprise two coils. However, in other embodiments, each batch can comprise a single coil.

In certain embodiments, at least one set of coils, and preferably each set of coils, comprises between 10 and 60 coils, preferably between 12 and 48 coils. In particular, within a given electric generating unit, the number of coils can be equal to the number of magnets; however, this equality is not essential.

In certain embodiments the coils of at least one set of coils, and preferably of each set of coils, comprise between 2 and 20 windings, preferably between 2 and 10 windings.

In certain embodiments, the coils of at least one set of coils are wound in a circular, oblong or triangular contour. In particular, the coils can extend mainly in the circumferential direction, or in the radial direction. This allows adjustment to the shape and to the disposition of the magnets.

In certain embodiments, at least one set of coils, and preferably each set of coils, is mounted on a collar applied to the particular frontal face of the particular planet gear or to the particular frontal surface of the planet carrier. This allows facilitating the installation of the coils, the latter being able to be assembled firstly to the collar, then, secondly, the entire collar being assembled to the planet gear or the planet carrier. This also facilitates the maintenance of the reduction gear.

In certain embodiments, at least one coil, preferably each coil, of said at least one set of coils, is wound around a core carried by the collar. This, preferably ferromagnetic, core, allows channeling the magnetic field inside the coils, which improves the transfer of energy. A configuration of this type also facilitates the placement of the coils.

In certain embodiments, the distance between the plane of at least one set of magnets and the plane of the facing set of coils is comprised between 1 and 3 mm. This range of distance is preferably verified for all the magnets and all the coils. In fact, this air gap distance ensures good energy transfer between the magnets and the coils.

In certain embodiments, the planet gears are blocked axially with respect to the planet carrier. Blocking of this type allow ensuring a practically constant air gap between the magnets and the coils, which avoids undesired fluctuations in the current generated by the electric generator.

In certain embodiments, the planet gears are blocked axially with respect to at least one planetary gear set, i.e. with respect to the sun gear or to the ring gear. They can in particular be blocked with respect to the ring gear, by means of herringbone teeth for example. Axial blockage of this type allows ensuring practically constant positioning for the planet gears and therefore for the electric generator, which avoids undesired fluctuations in the current generated by the electric generator.

In certain embodiments, the power generated by the electric generator of a planet gear is comprised between 1 and 3 kW.

In certain embodiments, each planet gear is equipped with an electric generator. The electric generators of each of the planet gears can be connected in series or in parallel.

The present disclosure also relates to a turbomachine comprising a reduction gear according to any one of the preceding embodiments.

In certain embodiments, the turbomachine further comprises a fan and a low-pressure shaft, connected to a low-pressure turbine, in which the reduction gear is connected between the low-pressure shaft and the fan so as to drive the fan at a lower speed than that of the low-pressure shaft.

In certain embodiments, the low-pressure shaft is connected to the sun gear of the reduction gear, the fan is connected to the ring gear of the reduction gear and the planet carrier is fastened to the casing. The planet carrier is therefore blocked in rotation.

In the present disclosure, the terms "axial," "radial," "tangential," "interior," "exterior" and their derivatives are defined with respect to the axis of rotation of the planetary gear sets of the reduction gear; what is meant by the "axial plane" is a plane passing through this axis of rotation and by "radial plane" a plane perpendicular to this axis of rotation.

The aforementioned features and advantages, as well as others, will appear upon reading the detailed description that follows, of exemplary embodiments of the proposed reduction gear and turbomachine. This detailed description refers to the appended drawings.

BRIEF DESCRIPTION OF THE DRAWINGS

The appended drawings are schematic and are intended primarily to illustrate the principles of the disclosure.

In these drawings, from one figure to the next, identical elements (or parts of elements) are labeled with the same reference symbols.

FIG. 1 is an axial section plan of a turbomachine according to the disclosure.

FIG. 2 shows an outline schematic of a reduction gear example.

FIG. 3 is an axial section view of this reduction gear example.

FIG. 4 is a perspective view of the section of FIG. 3.

FIG. 5 is an enlargement of zone V of FIG. 4.

FIG. 6 is another detail view of the reduction gear example.

DESCRIPTION OF THE EMBODIMENTS

In order to make the disclosure more concrete, one example of a reduction gear is described in detail hereafter, with reference to the appended drawings. It is recalled that the invention is not limited to this example.

FIG. 1 shows, in section along a vertical plane passing through its main axis A, a double flow turbojet with a reduction gear 1 according to the disclosure. It includes, from upstream to downstream according to the circulation of the air stream, a fan 2, a low-pressure compressor 3, a high-pressure compressor 4, a combustion chamber 5, a high-pressure turbine 6 and a low-pressure turbine 7. It further includes a casing 30.

In a turbojet of this type with a reduction gear 1, the high pressure turbine 6 drives the high-pressure compressor 4 by means of a high-pressure shaft 8. The low-pressure turbine 7 for its part, also called the rapid turbine, drives the low-pressure compressor 3, also called the rapid compressor, by means of a low-pressure shaft 9. The rapid turbine 7 also drives the fan 2 by means of a speed reducer 10. In this manner, the fan 2 can be driven at a reduced speed, which is favorable from the aerodynamic standpoint, while the low-pressure compressor 4 can be driven at a higher speed, which is favorable from a thermodynamic standpoint.

As shown schematically in FIG. 2, this reducer 10 is an epicyclic gear train equipped with a ring gear 11, a sun gear 12, and planet gears 13. The planet gears 13 are mounted in rotation on the spindles 14 of a planet carrier 15. In the present configuration the sun gear 12 is driven by the low-pressure shaft 9, the ring gear 11 drives the shaft 2a of the fan 2, and the planet carrier 15 is fixed.

The reduction gear is shown in more detail in FIGS. 3 and 4. It is thus noted that the planet carrier 15 includes a front plate 15a and a rear plate 15b between which extend, at regular intervals, five spindles 14. A planet gear 13 is mounted in rotation on each of the spindles 14 by means of a rolling-element bearing 16. The planet gears 13 are blocked axially with respect to the planet carrier 15.

Each planet gear 13 has herringbone teeth 13a designed to mesh with the herringbone teeth 11a of the ring gear 11, as well as with the herringbone teeth 12a of the sun gear 12. In this manner, all the gears 11, 12, and 13 of the reduction gear 10 are blocked axially relative to one another.

Moreover, as is seen more clearly in FIG. 5, each planet gear 13 is equipped with an electric generator 20. More precisely, each electric generator 20 consists of two electric generating units 20a, 20b disposed symmetrically on either side of the planet gear 13.

The first electric generating unit 20a comprises a first set of permanent magnets 21 and a first set of coils 22. The magnets 21, made of Samarium-Cobalt alloy, are mounted on the forward frontal face 13v of the planet gear 13 so as to align the direction of their poles with the axis of rotation B of the planet gear 13, hence along the main axis A of the reduction gear 10 of the turbomachine 1. These magnets 21, 28 in number, are disposed along a ring gear centered on the axis of rotation B of the planet gear 13 while alternating the directions of their North poles. Thus, the magnets of which the North pole points forward 21a and the magnets of which the North pole points rearward 21b follow one another alternately over the entire circumference of the planet gear 13.

As is more clearly visible in FIG. 6, the first set of coils 22 is mounted on an annular collar 23 applied to the frontal surface 15v of the front plate 15a of the planet carrier 15 facing the forward frontal face 13v of the planet gear 13. The forward frontal face 13v and the forward frontal surface 15v are parallel and both extend in radial planes of the reduction gear: they are therefore orthogonal to the axial direction A.

More precisely, the first set of coils 22 includes three coil assemblies 22a, 22b, 22c connected in series within each assembly so as to form three distinct circuits. These coils 22, 27 in number, are disposed along a ring gear centered on the axis of rotation B of the planet gear 13 by following a sequence of first assembly, second assembly, third assembly. Thus, the coils of the first assembly 22a, the coils of the second assembly 22b and the coils of the third assembly 22c follow one after the other in alternation over the entire circumference of the collar 23.

All the coils 22 are wound around a direction parallel to the axis of rotation B of the planet gear. Moreover, they all share the same winding direction. More precisely, it is noted in FIG. 6 that the collar 23 has protrusions 23a forming the cores around which the coils 22 are wound. The collar 23 is made of a ferromagnetic material, and particularly of iron-cobalt alloy or of iron-nickel alloy.

In the present example, the magnets 21 and the coils 22 have an oblong shape extending in the circumferential direction, the shape of the coils 22 being disposed facing the shape of the magnets 21. More precisely, the ring formed by the coils 22 is disposed facing the ring formed by the magnets 21.

The second electric generating unit 20b is entirely similar to the first electric generating unit 20a, except that it is disposed symmetrically on the rear side of the planet gear 13.

Thus, it comprises a second set of permanent magnets 26 and a second set of coils 27 similar to the first set of magnets 21 and of coils 22, respectively. The magnets 26 are mounted on the rear frontal face 13r of the planet gear 13 similarly to the magnets 21 of the first set. The second set of coils 27 is also mounted on an annular collar 28 applied, for its part, to the frontal surface 15r of the rear plate 15b of the planet carrier 15 facing the rear frontal face 13r of the planet gear 13. The rear frontal face 13r and the rear frontal surface 15r are parallel and both extend in radial planes of the reduction gear: they are therefore orthogonal to the axial direction A.

The second set of magnets 26 therefore includes, in alternation, a first magnet assembly 26a, the North pole of which points forward, and a second magnet assembly 26b, the North pole of which points rearward. The second set of coils 27 therefore includes, for its part, in alternation, a first coil assembly 27a, forming a first circuit, a second set of coils 27b, forming a second circuit, and a third coils assembly 27c, forming a third circuit.

An electric generator 20 of this type can thus equip each of the planet gears 13. In the present example, the electric generator 20 of each planet gear 13 allows supplying an electrical power of 2 kW during the normal operation of the reduction gear 10. In all the reduction gear is thus capable of supplying 10 kW.

Thus, when the turbomachine 1 is in operation, the planet gears 13 rotate at high speed around their spindles 14, the planet carrier 15, for its part, remaining immobile. Consequently, the magnets 21, 26 of each electric generating unit 20a, 20b pass at high speed in front of the coils 22, 27 positioned facing them, which results, due to the alternation of the direction of the magnets 21, 26, in the induction of a current into the coils 22, 27. As a result, the cabling of the different coil assemblies 22, 27, results in the generation of a three-phase current, on three distinct terminals, by each electric generating unit 20a, 20b. The two electric generating units 20a, 20b are then connected in series in order to obtain a common output for the electric generator 20, then the electric generators 20 of each of the planet gears 13 are themselves assembled in series in order to obtain a common output for the entire reduction gear 10.

In this example, as already stated, the magnets 21, 26 and the coils 22, 27 have an oblong shape. However, it goes without saying that these magnets 21, 26 and these coils 22, 27 could have other shaped depending on the specificities of the intended application, particularly depending on the geometry of the planet gears.

Although the present invention has been described by referring to specific embodiments, it is obvious that modifications and changes can be performed on these examples without departing from the general scope of the invention as defined by the claims. In particular, individual features of the different embodiments illustrated/mentioned can be combined into additional embodiments. Consequently, the description and the drawings must be considered in an illustrative, rather than a restrictive sense.

It is also obvious that all the features described with reference to a method are transposable, alone or in combination, to a device, and conversely all the features described in reference to a device are transposable, alone or in combination, to a method.

The invention claimed is:

1. A mechanical reduction gear for a turbomachine, in particular for an aircraft, comprising:
    a sun gear equipped with external teeth, having a central axis forming a main axis of the mechanical reduction gear,
    a ring gear equipped with internal teeth, coaxial with the sun gear,
    planet gears, simultaneously meshed with the sun gear and the ring gear,
    a planet carrier, including a front plate and a rear plate between which extend, at regular intervals, spindles around which the planet gears are mounted in rotation, and
    at least one electric generator,
    wherein the electric generator comprises a first set of electromagnetic elements, disposed on a forward frontal face of a first planet gear, and a second set of electromagnetic elements disposed on a frontal surface of the front plate of the planet carrier facing the forward frontal face of said first planet so that the first set of electromagnetic elements and the second set of electromagnetic elements are disposed facing one another,
    wherein one among the first and second set of electromagnetic elements is a first set of coils, each coil of this first set of coils being wound around a direction parallel to the main axis,
    wherein the other among the first and second set of electromagnetic elements is a first set of magnets each of the poles of which is oriented in a direction parallel to the main axis so as to induce a current in the first set of coils when it is driven with a relative movement with respect to the first set of coils,
    wherein the electric generator comprises a third set of electromagnetic elements, disposed on a rear frontal face of the first planet gear, and a fourth set of electromagnetic elements disposed on a frontal surface of the rear plate of the planet carrier facing the rear frontal face of said first planet,
    wherein one among the third and fourth set of electromagnetic elements is a second set of coils, each coil of this second set of coils being wound around a direction parallel to the main axis, and
    wherein the other among the third and fourth set of electromagnetic elements is a second set of magnets each oriented in a direction parallel to the main axis so as to induce a current in the second set of coils when it is driven with a relative movement with respect to the second set of coils.

2. The mechanical reduction gear according to claim 1, wherein the rotation of the planet carrier is blocked.

3. The mechanical reduction gear according to claim 2 wherein the first set of electromagnetic elements is said first set of magnets and the second set of electromagnetic elements is said first set of coils.

4. The mechanical reduction gear according to claim 1, wherein the configuration of the second set of magnets is symmetrical with the configuration of the first set of magnets with respect to the median plane of the mechanical reduction gear, and wherein the configuration of the second set of coils is symmetrical with the configuration of the first set of coils with respect to the median plane of the mechanical reduction gear.

5. The mechanical reduction gear according to claim 1, wherein at least one set of magnets comprises a ring of several magnets, regularly spaced along the same circle centered on the axis of rotation of the planet gear, all oriented axially while alternating the direction of their North poles, wherein at least one set of coils comprises a ring of several coils, regularly spaced along the same circle centered on the axis of rotation of the planet gear, all wound around an axial direction, and wherein at least one set of coils comprises three coil assemblies, the coils of one given assembly being connected electrically to one another within the same circuit.

6. The mechanical reduction gear according to claim 1, wherein at least one set of coils is mounted on a collar applied to the particular frontal face of the particular planet gear or to the particular frontal surface of the planet carrier.

7. The mechanical reduction gear according to claim 6, wherein at least one coil of said at least one set of coils is wound around a core carried by the collar.

8. The mechanical reduction gear according to claim 1, wherein the distance between the plane of at least one set of magnets and the plane of the facing set of coils is comprises between 1 and 3 mm.

9. The mechanical reduction gear according to claim 1, wherein the planet gears are blocked axially with respect to the planet carrier.

10. The turbomachine, comprising the mechanical reduction gear according to claim 1.

11. The turbomachine according to claim 10, further comprising:
 a casing,
 a fan, and
 a low-pressure shaft, connected to a low-pressure turbine,
 wherein the mechanical reduction gear is connected between the low-pressure shaft and the fan so as to drive the fan at a lower speed than that of the low-pressure shaft, and
 wherein the low-pressure shaft is connected to the sun gear of the mechanical reduction gear, the fan is connected to the ring gear of the mechanical reduction gear and the planet carrier is fastened to the casing.

12. A mechanical reduction gear for a turbomachine, in particular
 for an aircraft, comprising:
 a sun gear equipped with external teeth, having a central axis forming a main axis of the mechanical reduction gear,
 a ring gear equipped with internal teeth, coaxial with the sun gear, planet gears, simultaneously meshed with the sun gear and the ring gear,
 a planet carrier, carrying spindles around which the planet gears are mounted in rotation, and
 at least one electric generator,
 wherein the electric generator comprises a first set of electromagnetic elements, disposed on a forward frontal face of a first planet gear, and a second set of electromagnetic elements disposed on a frontal surface of the front plate of the planet carrier, said frontal surface of the front plate of the planet carrier extending facing the forward frontal face of the sun gear so that the first set of electromagnetic elements and the second set of electromagnetic elements are disposed facing one another,
 wherein one among the first and second set of electromagnetic elements is a first set of coils, each coil of this first set of coils being wound around a direction parallel to the main axis,
 wherein the other among the first and second set of electromagnetic elements is a first set of magnets each of the poles of which is oriented in a direction parallel to the main axis so as to induce a current in the first set of coils when it is driven with a relative movement with respect to the first set of coils,
 wherein the electric generator comprises a third set of electromagnetic elements, disposed on a rear frontal face of the first planet gear, and a fourth set of electromagnetic elements disposed on a frontal surface of the rear plate of the planet carrier, said frontal surface of the rear plate extending facing the rear frontal face of the first planet gear,
 wherein one among the third and fourth set of electromagnetic elements is a second set of coils, each coil of this second set of coils being wound around a direction parallel to the main axis,
 wherein the other among the third and fourth set of electromagnetic elements is a second set of magnets each oriented in a direction parallel to the main axis so as to induce a current in the second set of coils when it is driven with a relative movement with respect to the second set of coils,
 wherein at least one set of magnets comprises a ring of several magnets, regularly spaced along the same circle centered on the axis of rotation of the planet gear, all oriented axially while alternating the direction of their North poles,
 wherein at least one set of coils comprises a ring of several coils, regularly spaced along the same circle centered on the axis of rotation of the planet gear, all wound around an axial direction, and
 wherein at least one set of coils comprises three coil assemblies, the coils of one given assembly being connected electrically to one another within the same circuit.

13. A mechanical reduction gear for a turbomachine, in particular for an aircraft, comprising:
 a sun gear equipped with external teeth, having a central axis forming a main axis of the mechanical reduction gear,
 a ring gear equipped with internal teeth, coaxial with the sun gear, planet gears, simultaneously meshed with the sun gear and the ring gear,
 a planet carrier, carrying spindles around which the planet gears are mounted in rotation, and
 at least one electric generator,
 wherein the electric generator comprises a first set of electromagnetic elements, disposed on a forward frontal face of a first planet gear, and a second set of electromagnetic elements disposed on a frontal surface of the front plate of the planet carrier, said frontal surface of the front plate of the planet carrier extending facing the forward frontal face of the sun gear so that the first set of electromagnetic elements and the second set of electromagnetic elements are disposed facing one another,
 wherein one among the first and second set of electromagnetic elements is a first set of coils, each coil of this first set of coils being wound around a direction parallel to the main axis,
 wherein the other among the first and second set of electromagnetic elements is a first set of magnets each of the poles of which is oriented in a direction parallel to the main axis so as to induce a current in the first set of coils when it is driven with a relative movement with respect to the first set of coils,
 wherein the electric generator comprises a third set of electromagnetic elements, disposed on a rear frontal face of the first planet gear, and a fourth set of electromagnetic elements disposed on a frontal surface of the rear plate of the planet carrier, said frontal surface of the rear plate extending facing the rear frontal face of the first planet gear, wherein one among the third and fourth set of electromagnetic elements is a second set of coils, each coil of this second set of coils being wound around a direction parallel to the main axis, wherein the other among the third and fourth set of electromagnetic elements is a second set of magnets each oriented in a direction parallel to the main axis so as to induce a current in the second set of coils when it is driven with a relative movement with respect to the second set of coils, and wherein the distance between the plane of at least one set of magnets and the plane of the facing set of coils is between 1 and 3 mm.

\* \* \* \* \*